(12) United States Patent
Lee et al.

(10) Patent No.: US 8,217,960 B2
(45) Date of Patent: Jul. 10, 2012

(54) DEVICE AND METHOD FOR ADJUSTING VIDEO LUMINANCE

(75) Inventors: Wei-Kuo Lee, Hsinchu County (TW); Yi-Fan Chen, Taichung (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1235 days.

(21) Appl. No.: 11/524,371

(22) Filed: Sep. 21, 2006

(65) Prior Publication Data
US 2007/0121014 A1    May 31, 2007

(30) Foreign Application Priority Data
Nov. 28, 2005    (TW) .............................. 94141725 A

(51) Int. Cl.
*G09G 5/02*    (2006.01)
(52) U.S. Cl. ........ 345/600; 345/426; 345/589; 345/601; 345/605; 382/167
(58) Field of Classification Search ................... None
See application file for complete search history.

(56) References Cited

U.S. PATENT DOCUMENTS

| 6,384,838 | B1 * | 5/2002 | Hannah ........................ 345/601 |
| 6,965,691 | B2 * | 11/2005 | Walmsley et al. ............. 382/162 |
| 7,847,973 | B2 * | 12/2010 | Schoner ........................ 358/1.9 |

* cited by examiner

*Primary Examiner* — Antonio A Caschera
(74) *Attorney, Agent, or Firm* — Birch, Stewart, Kolasch & Birch, LLP

(57) ABSTRACT

A device and a method for adjusting video luminance of at least a color in a display wherein the color is appointed by the user. The device comprises: a color flag generating module for transforming a plurality of color signals into a plurality of color flags; a luminance adjustment value calculating module for calculating a luminance adjustment output value according to a plurality of luminance adjustment input values of different colors and the plurality of color flags; and a luminance output module for applying the luminance adjustment output value to a luminance input signal so as to generate a luminance output signal. Using the device and the method according to the present invention, the user can respectively adjust the luminance of different colors.

10 Claims, 3 Drawing Sheets

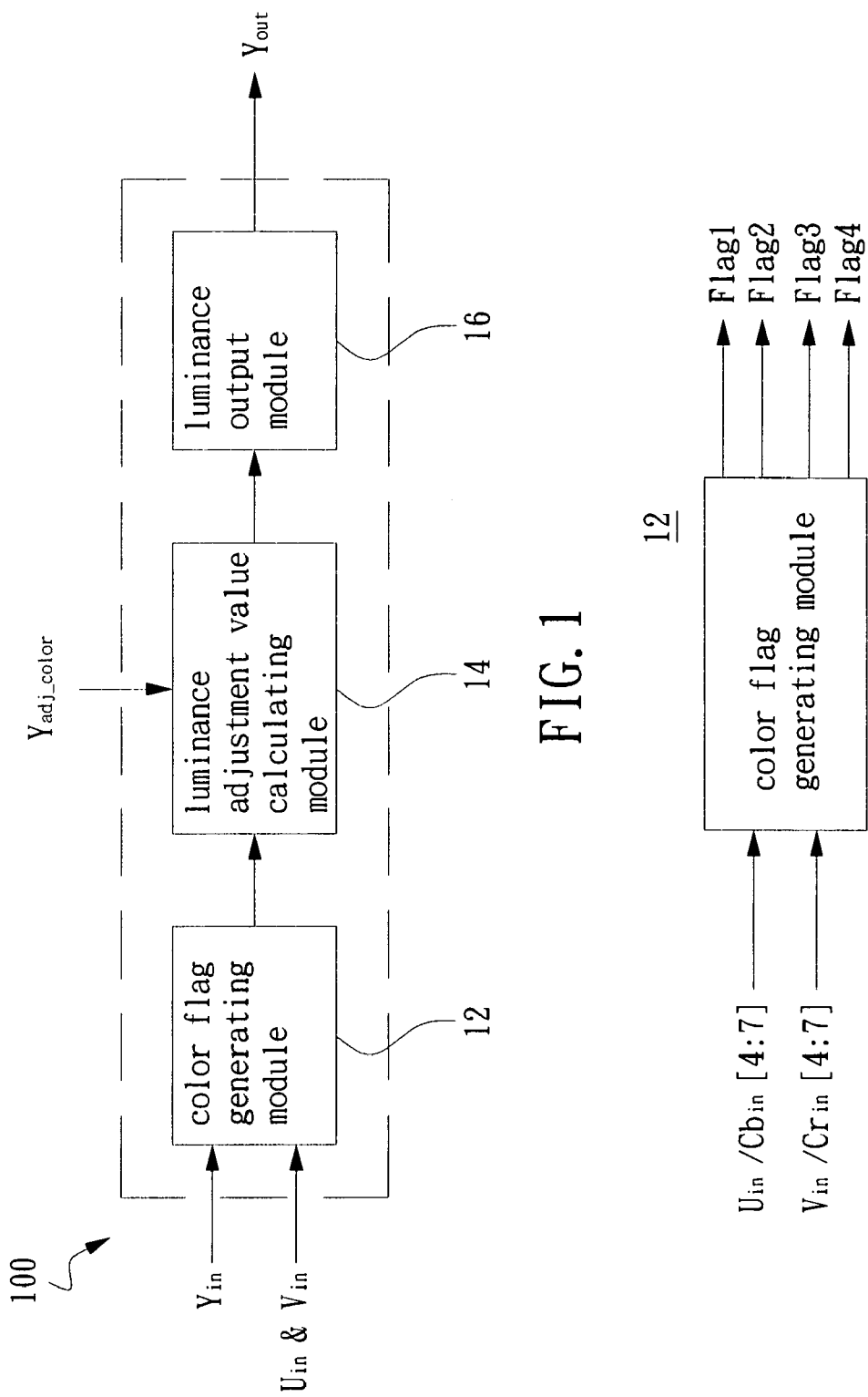

DEVICE AND METHOD FOR ADJUSTING VIDEO LUMINANCE

BACKGROUND OF THE INVENTION

1. Field of the Invention

The present invention generally relates to a field of luminance adjustment for a display and, more particularly, to a device and a method for adjusting video luminance of at least a color in a display wherein the color is appointed by the user.

2. Description of the Prior Art

The user communicates with an electronic device through messages processed by a display of the electronic device so as to make the most of the electronic device. The computer is an example of such an electronic device.

Displays can be categorized into several types with different sizes such as the cathode ray tube (CRT), the liquid crystal display (LCD), the light-emitting diode (LED), the plasma display panel (PDP) and so forth. Whatever the type and the size of a display, the display provides a number of settings for the user to determine his/her personal display parameters such as the color saturation, the chrominance and the luminance.

The display signals of a display include a luminance signal and a chrominance signal. When the luminance is being adjusted or determined, a conventional luminance adjustment device only provides the user with overall luminance adjustment instead of luminance adjustment for an appointed color. This leads to limited options for the user to determine the luminance according to his/her favor and thus unsatisfactory performance of the display.

Accordingly, for a display that displays video signals, there is need in providing a luminance adjustment technology for independently adjusting the video luminance of an appointed color.

SUMMARY OF THE INVENTION

It is one object of the present invention to provide a device for adjusting video luminance of at least a color in a display wherein the color is appointed by the user.

It is another object of the present invention to provide a method for adjusting video luminance of at least a color in a display wherein the color is appointed by the user.

In order to achieve the foregoing objects, the present invention provides device for adjusting video luminance, comprises: a color flag generating module for transforming a plurality of color signals into a plurality of color flags; a luminance adjustment value calculating module for calculating a luminance adjustment output value according to a plurality of luminance adjustment input values of different colors and the plurality of color flags; and a luminance output module for applying the luminance adjustment output value to a luminance input signal so as to generate a luminance output signal.

The present invention further provides a method for adjusting video luminance, comprising steps of: transforming a plurality of color signals into a plurality of color flags; calculating a luminance adjustment output value according to a plurality of luminance adjustment input values of different colors and the plurality of color flags; and applying the luminance adjustment output value to a luminance input signal so as to generate a luminance output signal.

BRIEF DESCRIPTION OF THE DRAWINGS

The objects, spirits and advantages of the preferred embodiment of the present invention will be readily understood by the accompanying drawings and detailed descriptions, wherein:

FIG. 1 is a functional block of a device for adjusting video luminance according to the present invention;

FIG. 2 is a functional block of a color flag generating module according to one embodiment of the present invention;

DETAILED DESCRIPTION OF THE PREFERRED EMBODIMENT

The present invention discloses a device and a method for adjusting video luminance of at least a color in a display and can be exemplified by the preferred embodiment as described hereinafter.

Please refer to FIG. 1, which is a functional block of a device for adjusting video luminance according to the present invention. The device 100 comprises a color flag generating module 12, a luminance adjustment value calculating module 14 and a luminance output module 16. The color flag generating module 12 transforms input color signals $U_{in}$ and $V_{in}$ (or Cb and Cr) into color flags corresponding thereto. The signal transformation is completed by using a pre-designed look-up table so as to enhance the transformation efficiency. The luminance signals and color signals received by a typical display are 8-bit. A large memory capacity is required for a look-up table to correspond to complete 8-bit color signals. Therefore, in one embodiment of the present invention, a look-up table having smaller capacity, such as a 16×16 look-up table, is used to obtain a set of color flags. Please refer to FIG. 2, which is a functional block of a color flag generating module 12 according to one embodiment of the present invention. In the color flag generating module 12 in the present embodiment, four most significant bits (MSB) of the color signals are used with the look-up table to obtain four color flags (Flag1, Flag2, Flag3 and Flag4).

Figure 3:
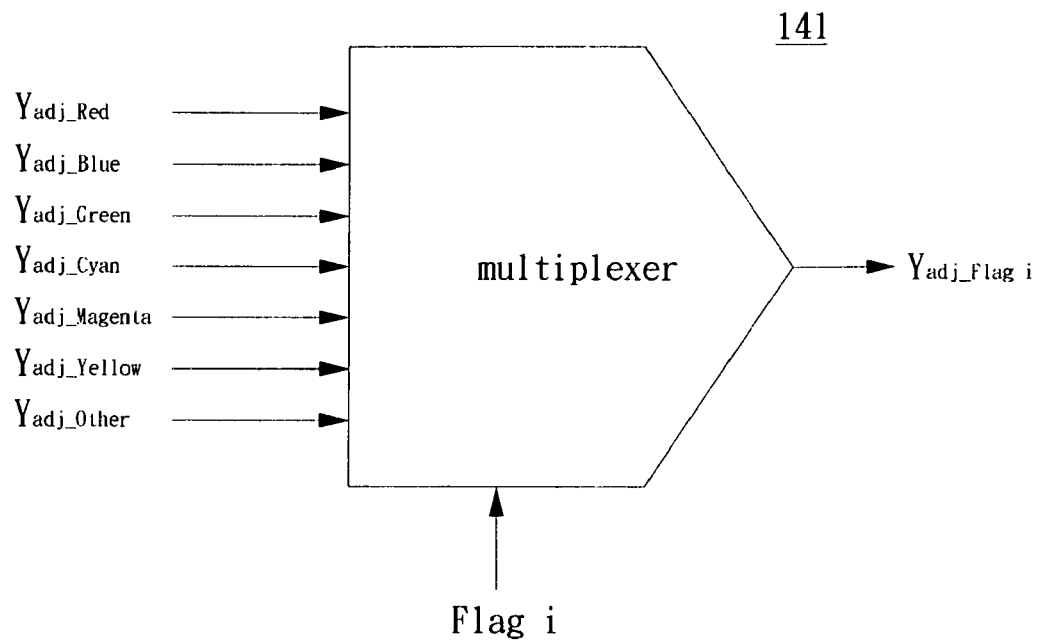
FIG. 3 is a functional block of a multiplexer in a luminance adjustment value calculating module according to one embodiment of the present invention.
Figure 4:
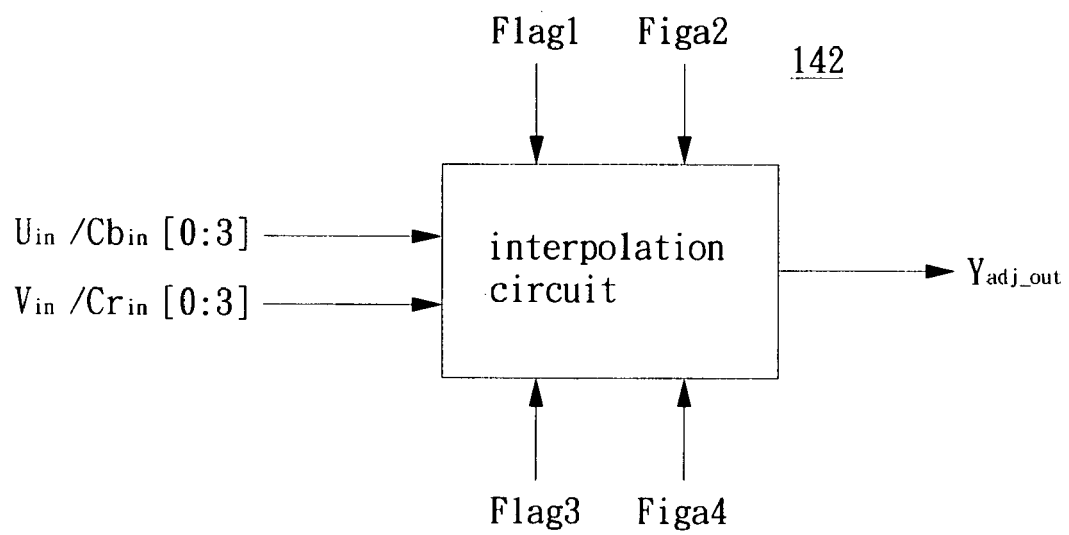
FIG. 4 is a functional block of an interpolation circuit in a luminance adjustment value calculating module according to one embodiment of the present invention.

The luminance adjustment value calculating module 14 uses the plurality of color flags to calculates a luminance adjustment output value corresponding to a plurality of luminance adjustment input values of different colors. In one embodiment, the luminance adjustment value calculating module 14 comprises at least a multiplexer as shown in FIG. 3, which is a functional block of a multiplexer 141 in a luminance adjustment value calculating module 14. The luminance adjustment input values (such as $Y_{adj\text{-}Red}$, $Y_{adj\text{-}Green}$, $Y_{adj\text{-}Blue}$, $Y_{adj\text{-}Cyan}$, $Y_{adj\text{-}Magenta}$, $Y_{adj\text{-}yellow}$ and so on) of different colors are input by the user into the multiplexer 14. Also, the color flags (Flag1, Flag2, Flag3 and Flag4) functioning as control signals are input into the multiplexer 14. Thus, a set of approximate luminance adjustment output values $Y_{adj\text{-}Flagi}$ are obtained. Then, four least significant bits (LSB) of the color signals and four approximate luminance adjustment output values $Y_{adj\_Flagi}$ (i=1, 2, 3 and 4) are input into an interpolation circuit 142, as shown in FIG. 4, so as to obtain a final luminance adjustment output value $Y_{adj\_out}$. The aforesaid interpolation circuit 142 can be implemented using a two-dimensional linear interpolation circuit or three one-dimensional linear interpolation circuits. In the embodiment of the present invention, firstly, the most significant bits of the color signals are used so that the color flag generating module 12 generates the corresponding color flags and the multiplexer is used to obtain the approximate luminance adjustment output values. Secondly, the interpolation circuit 142 is used to obtain the final luminance adjustment output value. In this manner, the memory capacity required for the look-up table is dramatically reduced, and so is the overall cost.

Finally, the luminance output module 16 applies the luminance adjustment output value $Y_{adj\_out}$ to a luminance input signal $Y_{in}$ so as to output a luminance output signal $Y_{out}$. The luminance output module 16 comprises an adder for summing up the luminance adjustment output value $Y_{adj\_out}$ and the luminance input signal $Y_{in}$ so as obtain the ultimate luminance output signal $Y_{out}$.

Figure 5:
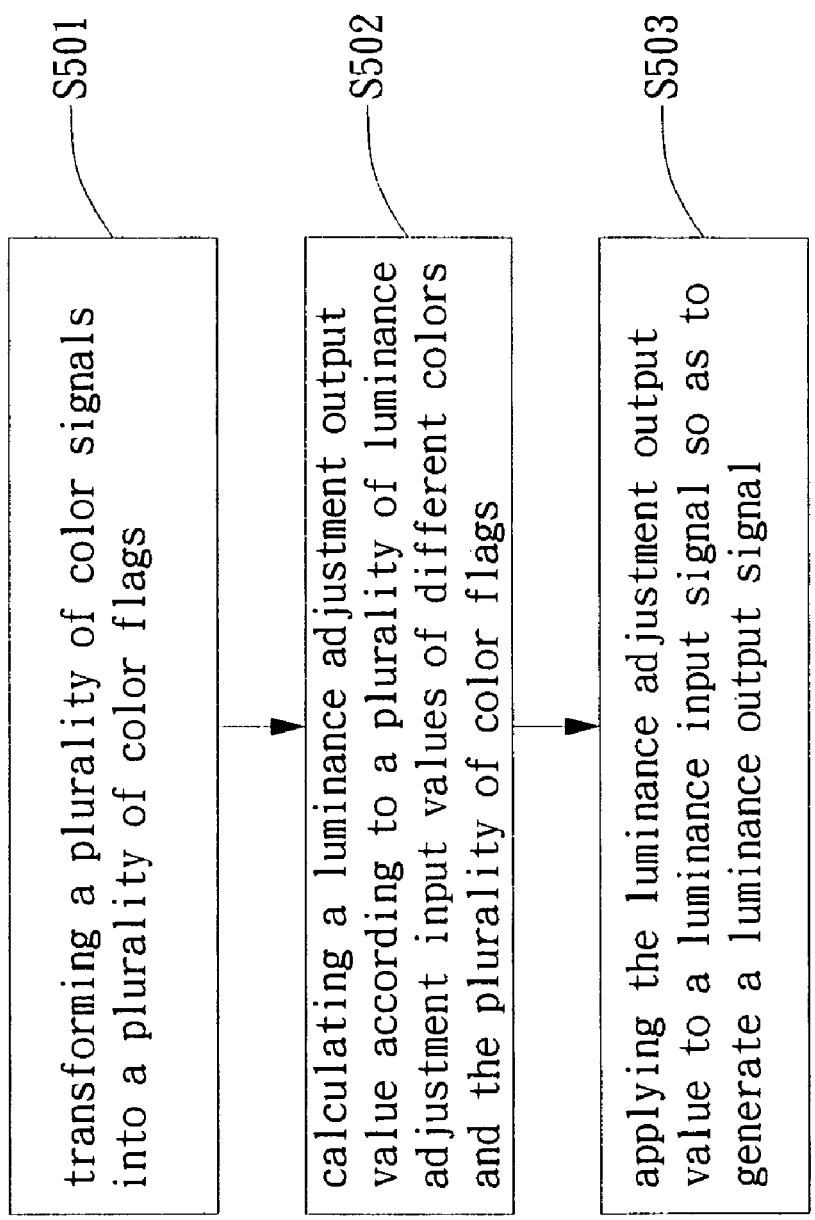
FIG. 5 is a flow-chart showing a method for adjusting video luminance according to the present invention.

The present invention further provides a method for adjusting video luminance of at least a color in a display wherein the color is appointed by the user. The method is described with reference to FIG. 5, which is a flow-chart. In Step S501, a plurality of color signals are transformed into a plurality of color flags. More particularly, the input color signals include $U_{in}$ and $V_{in}$ or Cb and Cr. Typically, the color signals are 8-bit. The signal transformation is completed by using a look-up table. As aforementioned, in order to downsize the memory capacity, in one embodiment of the present invention, a look-up table having smaller capacity instead of a look-up table capable of corresponding to complete 8-bit color signals is used. Most significant bits (MSB) of the color signals are used to obtain a set of color flags.

In Step S502, a luminance adjustment output value is calculated according to a plurality of luminance adjustment input values of different colors and the plurality of color flags. In one embodiment of the present invention, the luminance adjustment input values of different colors and the color flags are input by the user into a multiplexer so as to obtain a set of approximate luminance adjustment output values $Y_{adj\text{-}Flagi}$. Then, the approximate luminance adjustment output values and the least significant bits (LSB) of the color signals are input into an interpolation circuit so as to obtain a final luminance adjustment output value.

In Step S503, the luminance adjustment output value is applied to a luminance input signal so as to generate a luminance output signal. In one embodiment, the luminance adjustment output value and the luminance input signal are summed up so as obtain the luminance output signal.

Although this invention has been disclosed and illustrated with reference to particular embodiments, the principles involved are susceptible for use in numerous other embodiments that will be apparent to persons skilled in the art. For example, the look-up table for color flags can be stored not only in an external memory device; the color signals can have other than 8 bits and the number of color signals can be more than 2; the luminance adjustment values input by the user are not limited to those mentioned in the specification; the multiplexer can be replaced by any other device that achieves the equivalent function; and the selected bits from the color signals can be asymmetrical. This invention is, therefore; to be limited only as indicated by the scope of the appended claims.

What is claimed is:

1. A device for adjusting video luminance, comprising:
    a color flag generating module for transforming a plurality of color signals into a plurality of color flags;
    a luminance adjustment value calculating module for calculating a luminance adjustment output value according to a plurality of luminance adjustment input values of different colors and the plurality of color flags; and
    a luminance output module for applying the luminance adjustment output value to a luminance input signal so as to generate a luminance output signal;
    wherein the color flag generating module generates the plurality of color flags according to most signification bits (MSBs) of the color signals;
    wherein the luminance adjustment value calculating module comprises:
        a multiplexer for outputting at least one of the plurality of luminance adjustment input values according to the plurality of color flags; and
        an interpolation circuit for generating the luminance adjustment output value according to the at least one luminance adjustment input value and least signification bits (LSBs) of the color signals;
    wherein the MSBs include at least one bit selected from the color signals, the LSBs include all the rest bits of the color signals not selected by the MSBs, and a sum of bit number of the MSBs and LSBs is equal to that of the color signals.

2. The device as recited in claim 1, wherein the color flag generating module performs signal transformation by using a look-up table.

3. The device as recited in claim 1, wherein the plurality of color signals include U and V.

4. The device as recited in claim 1, wherein the plurality of color signals include Cb and Cr.

5. The device as recited in claim 1, wherein the luminance output module comprises an adder for summing up the luminance adjustment output value and the luminance input signal.

6. A method for adjusting video luminance applied to a display, comprising steps of:
    transforming a plurality of color signals into a plurality of color flags according to most signification bits (MSBs) of the color signals;
    selecting at least one luminance adjustment input value from a plurality of luminance adjustment input values of different colors according to the plurality of color flags;
    calculating a luminance adjustment output value by an interpolation circuit according to the at least one luminance adjustment input value and least signification bits (LSBs) of the color signals; and
    applying the luminance adjustment output value to a luminance input signal so as to generate a luminance output signal;
    wherein the MSBs include at least one bit selected from the color signals, the LSBs include all the rest bits of the color signals not selected by the MSBs, and a sum of bit number of the MSBs and LSBs is equal to that of the color signals.

7. The method as recited in claim 6, wherein the plurality of color flags are obtained by using a look-up table.

8. The method as recited in claim 6, wherein the plurality of color signals include U and V.

9. The method as recited in claim 6, wherein the plurality of color signals include Cb and Cr.

10. The method as recited in claim 6, wherein the luminance output signal is obtained by summing up the luminance adjustment output value and the luminance input signal.

* * * * *